United States Patent Office 3,509,106
Patented Apr. 28, 1970

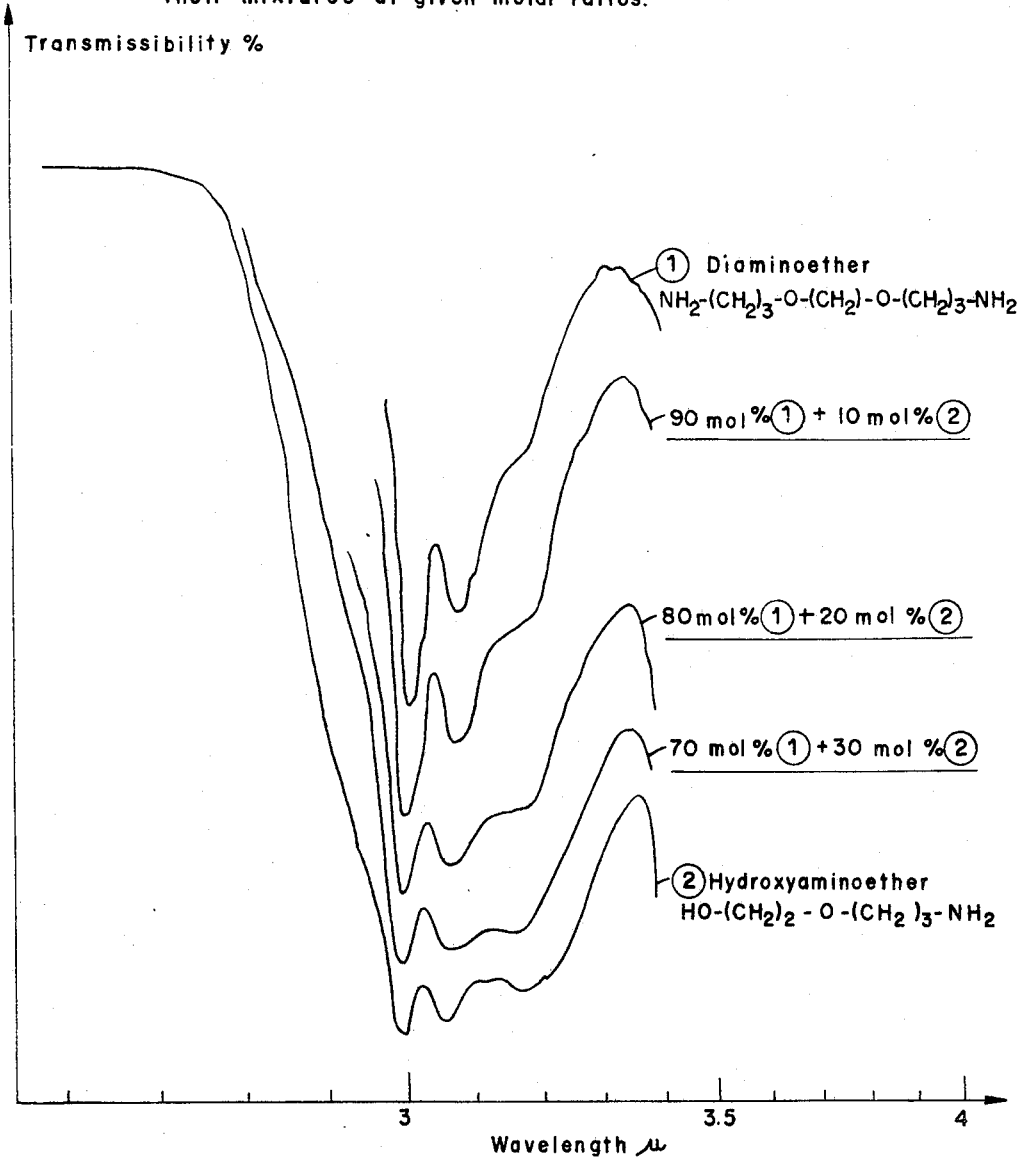
FIG. I  IR-Spectrum of ethylene-bis-(3-aminopropyl) ether and hydroxyethyl-aminopropylether in the range of the -OH and -NH vibrations, also showing the influence of their mixtures at given molar ratios.

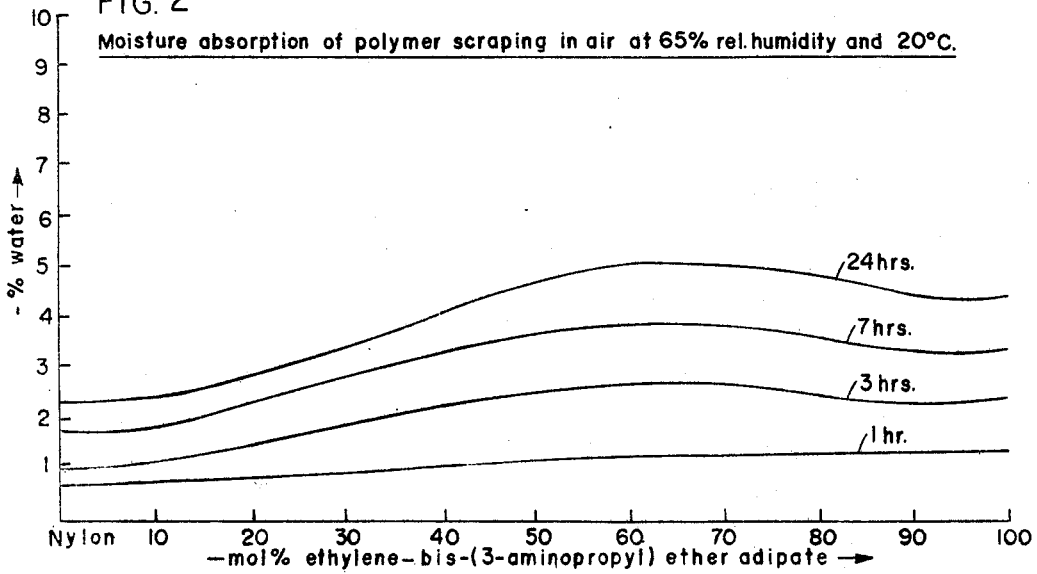
FIG. 2 Moisture absorption of polymer scraping in air at 65% rel. humidity and 20°C.
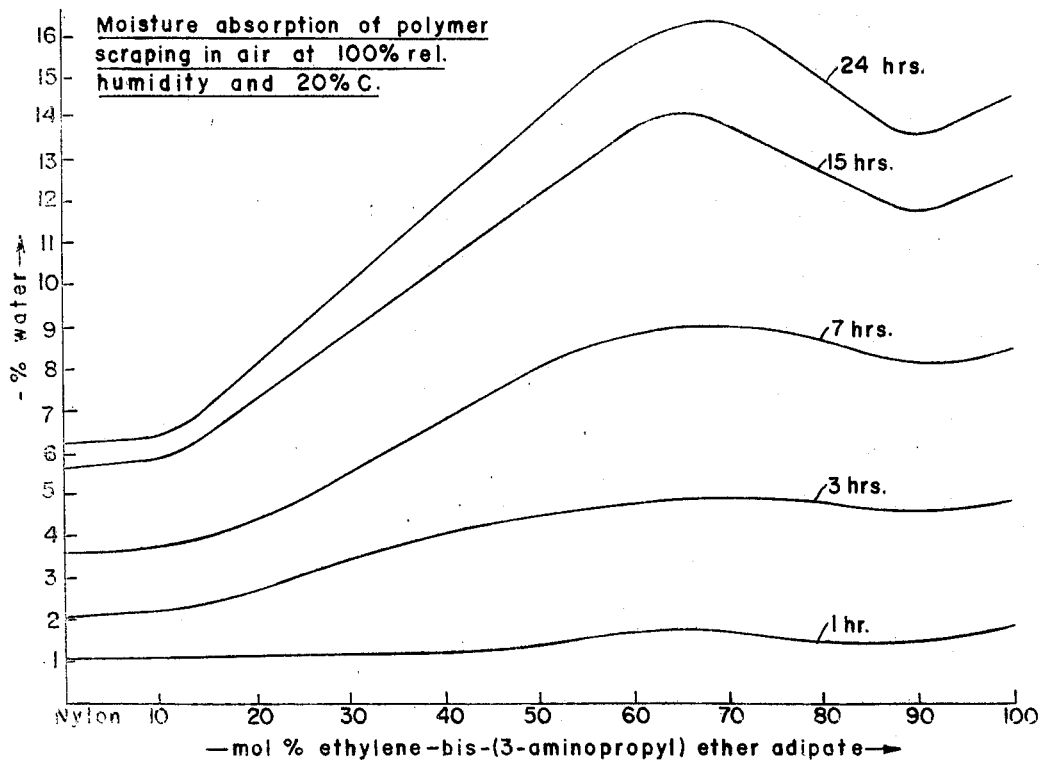
FIG. 3 Moisture absorption of polymer scraping in air at 100% rel. humidity and 20°C.

3,509,106
PROCESS FOR THE PRODUCTION OF A LINEAR FIBER-FORMING POLYAMIDE HAVING ETHER LINKAGES
Rudolf Lotz, Obernburg, Main, and Gerhard Wick, Erlenbach, Main, Germany, assignors to Glanzstoff AG, Wuppertal-Elberfeld, Germany
Filed July 26, 1967, Ser. No. 656,251
Claims priority, application Germany, Aug. 2, 1966, G 47,579
Int. Cl. C08g 20/24
U.S. Cl. 260—78    8 Claims

ABSTRACT OF THE DISCLOSURE

Production of a linear fiber-forming polyamide having ether linkages in the polymer chain by polycondensing an adipic acid salt of a diaminoether of the formula $$H_2N—(CH_2)_3—R—(CH_2)_3—NH_2$$

Figure 4:
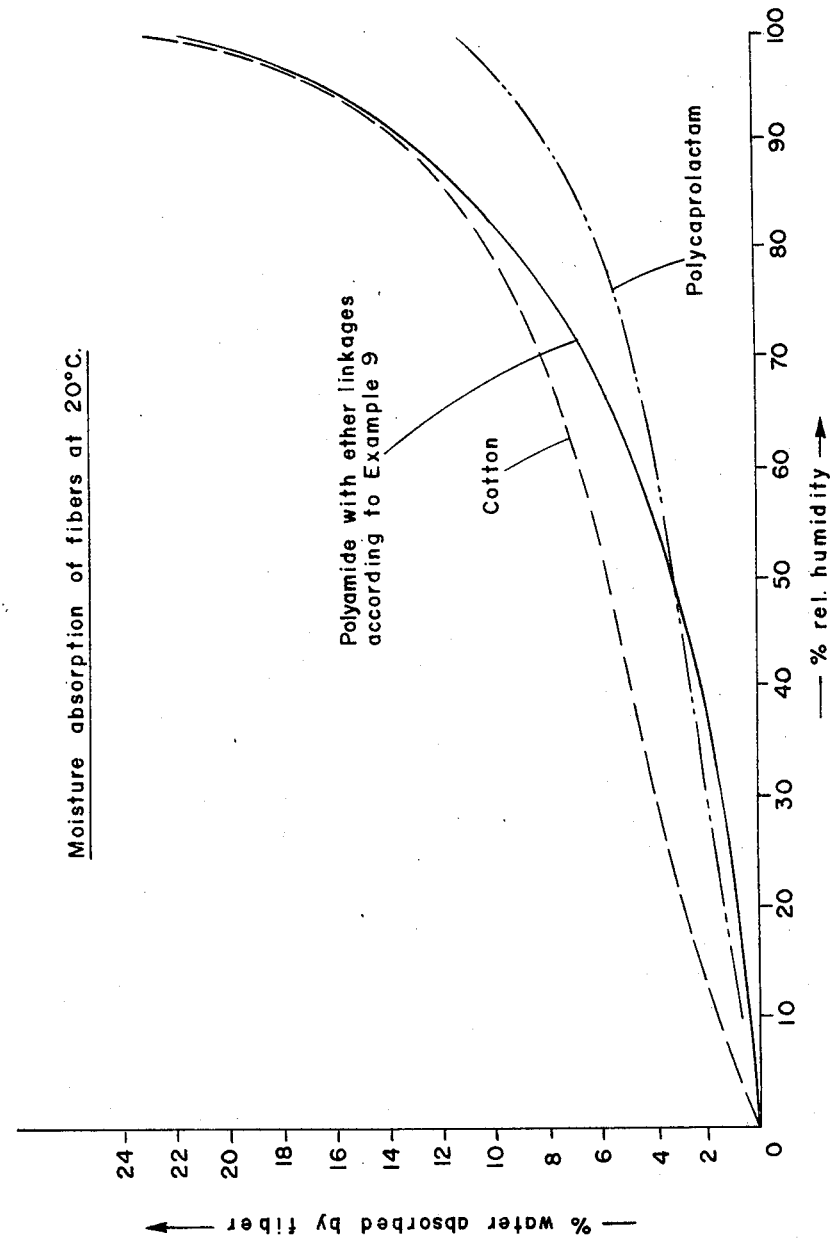

wherein R represents —O— or —O—$(CH_2)_n$—O—, $n$ being one of the integers 2, 3 or 4, either alone or in admixture with other adipic acid salts of aliphatic diamines, especially hexamethylenediamine adipate, wherein the adipic acid salts being condensed have a content of hydroxyaminoether of less than 1 mol percent, under controlled temperature conditions so as to obtain a high molecular weight linear fiber-forming polyamide. The resulting product can be processed into fibers having distinct textile properties.

---

The present invention is concerned with the production of a high molecular weight polyamide in which the polymer chain contains not only the usual recurring cabonamide linkages (—NHCO—) but also ether linkages by intercondensing as one of the monomeric reactants, ordinarily as its adipic acid salt, certain diaminoethers of the formula $H_2N—(CH_2)_3—R—(CH_2)_3—NH_2$ as defined above. In particular, the present invention is concerned with an improvement in the generally known polycondensation of these diaminoether adipates by eliminating hydroxyamino-ether impurities from the initial monomers and observing conditions in the polycondensation such that one can achieve a truly linear fiber-forming polyamide having unique properties heretofore unattained in synthetic polyamide fibers.

It is known, of course, that the presence of ether groups in the polymer chain changes the properties of polyamides; for example, such properties as the absorption of moisture, the capacity for water retention (swelling value and the dyeability) are increased while the tendency to accumulate an electrostatic charge is decreased. However, products of this kind described in the literature most concerned with polyamides have been found to be of very little commercial value or utility, because cracking or a splitting or cleaving decomposition occurs in the condensation of pure polyetheramides (O. Bayer, Angew. Chem., vol. 61, 1949, p. 233).

More particularly, polyamides have already been described which contain ethylene-bis-(3-aminopropyl)ether as the ether component or monomer. In order to avoid discolorations and a steep decline in the physical properties of polyamides made solely from such diaminoethers and aliphatic dicarboxylic acids, e.g. adipic acid, it has been necessary to carry out the entire polycondensation reaction of the ether-containing monomer in admixture with conventional and proven polyamide-forming substances, e.g. hexamethylenediamine adipate, whereby the latter conventional monomer is introduced and intercondensed in a very large excess. Otherwise, the resulting polyamide is practically useless as a textile or fiber-forming product.

Thus, German Patent No. 758,619 describes a process for the production of polyamides by the condensation of dicarboxylic acids and diamines and/or aminocarboxylic acids or their amide-forming derivatives wherein there must be used only up to 10% of a diamine whose carbon chain is interrupted by two or more oxygen atoms. The best polyamides capable of being produced by this process are those obtained wherein the component containing no ether groups consists of a co-condensate of epsilon-caprolactam and the salt of hexamethylenediamine and adipic acid in a proportionate ratio of 4:6 to 6:4. The resulting polycondensate, however, has such poor properties that filaments or fibers produced therefrom cannot acquire any significance as a textile material.

Polyamides of adipic acid and 3,3'-diaminopropylether are described in British Patent No. 487,734. This polycondensation product, which has a melting point or softening range of 185–190° C., is of such low molecular weight that technically useful filaments or fibers cannot be produced therefrom.

British Patent No. 565,350 is directed to a process for the production of copolyamides in which there are intercondensed 75–95 parts by weight of equimolar amounts of hexamethylenediamine and adipic acid and 5–25 parts by weight of equimolar amounts of a diaminoether and a dicarboxylic acid. As the diaminoethers (which may also be referred to as etherdiamines), there is mentioned inter alia ethylene-bis-(3-aminopropyl) - ether and propylene - bis - (3-aminopropyl)ether. From the example using the ethylene-bis-(3-aminopropyl)ether, which is the diaminoether yielding the best results according to the teaching of this patent, it is found that even the slight addition of only 5 parts of this diaminoether causes a steep decline of the "intrinsic viscosity" of the polycondensate, thereby having a negative influence on the physical properties of filaments drawn therefrom.

According to British Patent No. 574,713, in which there is likewise described the condensation of ethylene-bis-(3-aminopropyl)ether with dicarboxylic acids, the resulting condensate is found to be a brittle resin which is totally unsuitable for the production of technical filaments or fibers.

The use of diaminoethers in the production of polyamides has thus been investigated for over 20 years (prior to 1945) without discovering any products having satisfactory textile properties, i.e. so that one might obtain commercially useful filaments, fibers or films from the polycondensed materials, even though only slight proportions of the diaminoether were admixed with other conventional and highly useful polyamide-forming substances. For example, according to data given in Chemical Abstracts, vol. 49 (1955), pp. 4514–4515, the condensation of the adipic acid salt of butylene-bis-(3-aminopropyl)-ether merely resulted in dark brown colored products which are unsuitable for the production of filaments or fibers.

Experiments for the condensation of the adipic acid salt of ethylene-bis-(3-aminopropyl)ether with hexamethylene-diamine adipate were also undertaken by Kawakatsu and Imoto, Kôgyô Kagaku Zasshi, vol. 59, (1956), pp. 1217–19; Chemical Abstracts (1958), pp. 14534. According to this work, however, only those mixed polycondensates with content at the very most of 10% of ethylene-bis-(3-aminopropyl)ether are at all spinnable into filaments. Those polycondensation products having a content of more than 10% of the diaminoether adipate can no longer be spun into filaments because of their excessive brittleness.

It is an object of the present invention to provide a novel process for the production of high molecular weight, linear, fiber-forming polyamides having ether linkages in the polymer chain from the above-mentioned adipic acid salts of diaminoethers alone or in combination with conventional polyamide-forming adipates, whereby new and unique properties are imparted to the polycondensate so that it becomes highly useful as a textile filament, fiber or similar product. These and other objects and advantages of the invention are explained in detail in the following specification taken with the accompanying drawings.

It has now been found, in accordance with the invention that the difficulties encountered in all of the prior attempts to produce polyamides with ether linkages and the unsatisfactory properties of the polycondensate products of these prior processes can be overcome, provided that the polycondensation process is carried out under prescribed conditions using at least one of the diaminoethers having the formula $$H_2N-(CH_2)_3-R-(CH_2)_3-NH_2$$

wherein R is $-O-$ or $-O-(CH_2)_n-O-$ with $n=2$ to 4, preferably as the adipic acid salt thereof, with a hydroxyaminoether content of not more than 1 mol percent, preferably less than 0.5 mol percent, with reference to the total number of mols of the ether components, e.g. corresponding essentially to the total mols of the diamino- and hydroxy-amino-ether adipates present in the initial reaction mixture. The polycondensation may be carried out with a diamino-ether adipate having the prescribed minimal content of hydroxy-aminoether, i.e. being substantially free of this impurity, either alone or in admixture with conventional adipic acid salts of saturated aliphatic diamines such as hexamethylenediamine adipate, but preferably with more than 10% by weight of the diaminoether adipte, e.g. from 15% to 90% by weight and preferably 30–85% by weight. Surprisingly, when the polycondensation is carried out with the prescribed diaminoethers from which hydroxyaminoethers, i.e. impurities in which a saturated aliphatic chain has a terminal hydroxy group in place of one of the amino groups, have been substantially eliminated or previously separated, it is possible to achieve an excellent fiber-forming polyamide product.

The diaminoethers are most conveniently introduced for the production of polyamides or copolyamides in accordance with the invention in the form of their adipic acid salts. Examples of such salts may be identified as: bis-(3-aminopropyl)ether adipate; ethylene-bis-(3-aminopropyl)ether adipate; propylene-bis-(3 - aminopropyl) ether adipate; and butylene-bis-(3 - aminopropyl)ether adipate. Of these compounds, it has been found that ethylene-bis-(3-aminopropyl)ether adipate is especially useful because it yields a polycondensate with a higher melting point. These compounds may also be referred to as the "adipamides," but in either case they represent an equimolar combination of the ether with the dicarboxylic acid.

It is of decisive importance, as much for the processability of the polycondensate as for its desirable physical properties, to use initial reactants (i.e., the diaminoethers or their salts) which have been properly purified. Only if the initial diaminoether contains less than 1 mol percent of the hydroxyaminoether impurity, is it possible to successfully prepare a polycondensate having desirable viscosity characteristics and a good workability into filaments. In particular, it is especially desirable to produce a polycondensate having a relative viscosity of between about 2.0 and 3.5.

In addition, specific process conditions must be observed and maintained in the polycondensation reaction. Thus, during the initiation or first precondensation stage, the reaction temperature should be as low as possible while still maintaining the condensation reaction mixture in the molten state. The temperature should preferably deviate only slightly from the melting point of the precondensate, e.g. within about 20° C. of its melting point, and in no case should the initial reaction temperature exceed 250° C. In the final polycondensation stage and depending upon the particular monomeric reactants, the temperature is about 10–60° C. higher than the initial or precondensation temperature. In general, the precondensation is carried out at temperatures of about 160–240° C., especially 180–220° C., while the succeeding or final polycondensation can take place at about 200–300° C., preferably about 220–285° C., depending upon the initial reactants.

In the production of copolyamides with a molar proportion of the diaminoether adipate of 70% or more, or in the production of polyamides which contain exclusively the diaminoether as the amine component, the precondensation is best carried out under normal pressure (1 atm.) or at an elevated pressure up to not more than about 10 atm.

By observing these polycondensation conditions according to the invention, the reaction can be readily carried out for a period of time sufficient to produce a linear, fiber-forming polycondensate of the specified diaminoethers and adipic acid either as the homocondensate of these monomeric substances or as copolyamides when they are mixed in any proportion with hexamethylenediamine adipate. All of these products are hard, colorless polyamides which are readily spun and stretched into textile filaments. It is especially desirable to carry out the polycondensation to the point where the product exhibits a solution viscosity ($\eta_{rel}$) between 2 and 3.5 (measured as a 1% by weight solution in 90% aqueous formic acid at 25° C. in an Ostwald viscometer). The relative viscosity is determined by the equation:

$$\eta_{rel} = \frac{\text{flow time of the solution}}{\text{flow time of the pure solvent}}$$

and throughout this specification it is determined as said 1% by weight solution in 90% aqueous formic acid at 25° C.

The polymer can be processed with conventional apparatus into filaments, foils, films and the like which are distinguished by very interesting properties. It is significant that filaments made from the homo-polyaminoether-adipates and their copolyamides with hexamethylenediamine adipate at slight or medium atmospheric moisture conditions a moisture absorption which is relatively limited corresponding to the properties exhibited by the best known polyamides of caprolactam or hexamethylenediamine adipate, e.g. the usual nylons, wherein the very rapid drying action after washing represents a substantial advantage over natural fibers.

At conditions of higher atmospheric moisture, by comparison, the moisture absorption of the polyamides with ether linkages of this invention achieves a much higher value which is otherwise practically observed only with natural fibers. Moreover, polyamides can be prepared according to the present invention to provide a capacity for water retention varying within a range of about 10 to 90%.

The preparation of the diaminoether reactant can be accomplished in accordance with known reaction principles as shown in the following reaction equations for producing ethylene-bis-(3-aminopropyl)ether by way of example:

(1) FIRST STAGE (a)

(I)

(b)

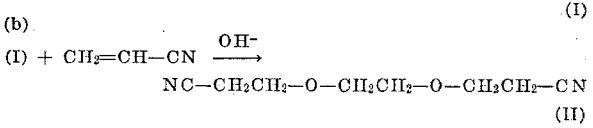

(II)

(2) SECOND STAGE (II) + H$_2$ $\xrightarrow[\text{Cat.}]{\text{Raney}\atop\text{Cobalt}}$ H$_2$N—(CH$_2$)$_3$—O—CH$_2$CH$_2$—O—(CH$_2$)$_3$—NH$_2$ (III)

In the first stage, the glycol (ethylene glycol in this instance) is added to acrylonitrile in the presence of aqueous alkali at 25–40° C., and in a second stage the resulting dinitrile (II) is hydrogenated in the presence of a suitable catalyst, e.g. Raney cobalt, in order to form the corresponding diamine (III). The product formed in the first reaction step contains—in addition to the cyanoethyl-hydroxyethyl ether (I)—other impurities consisting primarily of 2-cyanoethylalcohol=NC—CH$_2$CH$_2$—OH  (IV)

and dicyanoethylether=NC—(CH$_2$)$_2$—O—(CH$_2$)$_2$—CN  (V)

because the water available in the first step enters into the reaction. (The dicyanoethylether (V) is capable of being prepared from acrylonitrile and water.)

The purification of the nitrile mixture obtained in the first stage does not provide a satisfactory means of removing the undesirable impurities, partly because there is too slight a difference in boiling points but primarily because the dinitrile (II) decomposes during a relatively slow column distillation.

Under the conditions of the catalytic hydrogenation in the second stage, there occurs a cracking or splitting of the ether linkages, whereby hydroxy-containing products are also formed, especially hydroxyethyl-aminopropyl-ether of the formula:

HO—(CH$_2$)$_2$—O—(CH$_2$)$_3$—NH$_2$  (VI)

In order to avoid the formation of such by-products, particularly the hydroxyaminoether (VI), which are most detrimental to the production of the desired polyamides with ether linkages, it is necessary to resort to several measures in the preparation of the monomeric diamino-ether reactant. First, the dinitrile (II) of the first stage should be extracted with a chlorohydrocarbon, preferably chloroform, from the reaction product mixed with water, thereby freeing the dinitrile from the singularly troublesome cyano-hydroxy compound (IV). By means of a subsequent rapid distillation of the extracted dinitrile, the desired ethylene-bis-(3-cyanoethyl)ether (II) can be obtained in a very pure form (B.P.=140° C. at 15 mm. Hg), the dicyanoether (V) being easily separated as the first or top run of the distillation. Also, by adding pyrogallol, it is possible to substantially suppress the decomposition of the dinitrile during its preparation.

On account of the hydrolytic or alcoholytic cleaving or splitting which can result from the catalytic hydrogenation, it is desirable to employ a solvent or dispersing agent which is substantially free of water and/or alcohol. Good solvents or dispersants as an inert liquid medium for the hydrogenation are hydrocarbons such as benzene, toluene, cyclohexane and especially tetrahydrofuran.

The desired diaminoether product (III) is then capable of being separated from the especially harmful hydroxy-aminoether (VI) by careful fractional distillation in a column, by reason of the relatively small proportion of the impurity then present when the dinitrile has first been extracted with a chlorohydrocarbon. It will later be shown that even very small amounts of the hydroxyaminoether (VI) can have a most unfavorable influence on the production of polyamides and their properties.

Various methods can be used to determine the purity of the desired diaminoether. For example, the determination of the mixed melting point of the adipate by a series of comparative melting point measurements permits one to detect the presence of the hydroxyaminoether down to amounts of 1–2 mol percent (see Table I).

TABLE 1

Mixed melting point of the adipate of (III) and (VI) up to 10 mol percent of (VI).

| Content of (VI) in the adipate—in mol percent: | Melting point— ° C. in a copper block |
|---|---|
| 0 | 128.5 |
| 0.5 | 128–128.5 |
| 1 | 127–127.5 |
| 3 | 126–126.5 |
| 5 | 125–125.5 |
| 10 | 122.5–123 |
| 100 | 87–88 |

The melting points of the dibenzoyl derivatives of ethylene-bis(3-aminopropyl)ether (III) and the hydroxyethylaminopropyl-ether (VI) can also be very precisely distinguished:

Dibenzoyl derivative of (III), M.P.=106.2° C.
Dibenzoyl derivative of (VI), M.P.=67.0° C.

(melting points determined optically according to Kofler). The IR-spectrum offers a similar precise means of testing even though the —OH and —NH wavelengths overlap (see FIG. 1).

Paper chromatography represents, however, the best means of detection. (R$_F$=value of the diaminoether (III)=0.3; and R$_F$=value of the hydroxyaminoether (VI)=0.5.) Without using special concentration procedures, the hydroxyaminoether impurity (VI) can be qualitatively detected down to as little as 0.1 mol percent. By means of comparative concentrations, a quantitative analysis is possible within the range of 0.2–0.5 mol percent of the impurity (VI). See paper by Schleicher and Schüll, No. 2043; using butanol-glacial acetic acid-water as the flow agent (Laufmittel) and ninhydrin-cadmium acetate as the developer (Entwickler).

Thus, in the polycondensation reaction, one proceeds from the pure diamine and dicarboxylic acid components. For stoichiometric reasons and ease in handling, the salts of equimolar amounts of the diaminoether (or diamine) and the dicarboxylic acid are preferred as the initial reactants. It is of course quite conventional to use hexamethylenediamine adipate in the usual production of nylon where this initial reactant is commonly named the "AH-salt." Similarly the diaminoether adipate can be referred to here as the "AD-salt." During the polycondensation, it is desirable to work under a protective gas, e.g. a nitrogen atmosphere. For the production of polyamides which are useful as textile fibers, those obtained from ethylene-bis-(3-aminopropyl) ether, hexamethylene diamine and adipic acid are considered to especially be suitable as the initial components, and although for purposes of convenience, the polycondensation is usually described and claimed herein in terms of the salt monomers, i.e. the AH-salt or the AD-salt, it will be recognized that the initial components can also be employed in a polycondensation where such salts are merely formed in situ, if only briefly.

The polycondensation of the initial materials can be accomplished with or without solvents or diluents. The condensation reaction is carried out in two stages as follows:

In the first or initial condensation stage (precondensation) the reaction temperature must be selected as low as possible, i.e. it should vary only slightly from the melting point of the precondensate as it is formed, and in no case should the temperature be permitted to rise above 250° C. Thereby, the loss of amine remains as slight as possible and thermal damage is avoided, particularly with respect to the diaminoether such that there can be no increase in the content of hydroxyaminoether impurity over the critical maximum content of 1% (molar percent with reference to the total of the hydroxyaminoether adipate and the AD-salt). The condensation can be carried out with or without the addition of water. The production of the precondensate, e.g. up to a solution viscosity of about 1.10 to 1.30, can be accomplished under normal pressure (1 atm.) or at an elevated pressure and preferably with conventional stirring or mixing. In the production of homocondensates of the adipic acid salts of diaminoethers (i.e. only the AD-salt) or copolyamides with a high proportion of the diaminoether component, e.g. of about 70 mol percent or more, a precondensation under normal pressure up to not more than 10 atm. is necessary if one is to achieve a final polycondensate product with a solution viscosity of at least about 2.

For the second or terminal stage (final condensation), the precondensate is further polycondensed at a temperature of about 10–60° C. higher than the first stage temperature and the condensation reaction is carried to completion when the desired solution viscosity of the polyamide is attained. In this second stage and regardless of the molar proportions of the initial reactants, it is preferable to work under a vacuum in order to shorten the reaction time.

The polycondensation of the diaminoether adipate (AD-salt) with the hexamethylenediamine adipate (AH-salt) can be accomplished with or without the addition of a catalyst. However, it has proven to be advantageous to incorporate, prior to the condensation, boric acid as a catalyst in an amount of about 0.01 to 0.5 mol percent with reference to the monomers (in the form of their salts). A stabilization of the macromolecule is achieved by this addition of boric acid as well as its catalytic effect on the speed of the condensation reaction. In order to limit the molecular weight of the polyamide, the usual acid or basic stabilizing agents or chain terminating agents can also be added in small amounts. These and other known variations in the usual polycondensation of conventional polyamide-forming substances such as the AH-salt can be followed without departing from the spirit or scope of the present invention.

The essential physical properties of the polyamides obtained according to the present invention can be explained in greater detail as follows:

With an increasing number of ether linkages in the polymer chain when copolymerizing to provide a mixed condensate of the alkylene-bis-(3-aminopropyl)ether, hexamethylene diamine and adipic acid, the capacity for water retention or so-called "swelling value" also increases, but without the viscosity or molecular weight of the polyamide being decreased below values required for good spinning into filaments. This represents an important advantage in comparison to the known processes discussed hereinabove. By the process of the invention, it is possible to successfully produce easily processed polyamides with ether linkages whose swelling values can be varied within a range of 15–89%. (The swelling value of wool and cotton amounts to 42% and 45%, respectively.) Thus, depending upon their composition, the polyamides of the invention can have a swelling value nearly double that of such natural fibers as wool or cotton.

Table 2 sets forth a summary of the swelling values of mixed polycondensates which have been produced as set forth in Example 11 below and in molar proportions ranging from 9:1 to 1:9 of the ethylene-bis(3-aminopropyl)ether adipate (AD-salt) to the hexamethylenediamine adipate (AH-salt).

TABLE 2

Capacity for water retention of mixed polycondensates:

Molar ratio (AD-salt:AH-salt):  Swelling value [1] (1%)
9:1 ............................................. 89
8:2 ............................................. 72
7:3 ............................................. 66
6:4 ............................................. 44
5:5 ............................................. 33

Molar ratio (AD-salt:AH-salt):  Swelling value [1] (1%)
4:6 ............................................. 28
3:7 ............................................. 21
2:8 ............................................. 17
1:9 ............................................. 14

[1] The swelling values were determined according to DIN-Specification 53814 (German Industrial Standards).

Another important property of the polyamides of the invention resides in their sharply distinct water absorption values at different conditions of atmospheric moisture. Scraped sample particles of the homocondensate or the mixed condensate having ether linkages absorb only slightly more water at a relative humidity of 65% than does a sample of conventional nylon, i.e. the homocondensate of hexamethylenediamine adipate (see FIG. 2). However, at a relative humidity of 100%, the water absorption of the polyamides of the invention increases sharply and in fact is dependent upon the molar proportion of the diaminoether on the polymer. With mixed condensates which contain about 70 mol percent of the AD-salt component, a maximum water absorption is attained (see FIG. 3).

Also, fibers made from the polyamides with ether linkages according to the invention behave in an analogous manner. As can be seen from FIG. 4, practically the same amounts of water are absorbed in the lower range up to 60% relative humidity as occurs with polyamides of caprolactam or hexamethylenediamine adipate, whereas at a relative humidity between 60% and 100% the moisture absorption corresponds to that of cotton under the same conditions.

The process of the invention thus succeeds for the first time in producing a polyamide fiber which possesses the same moisture absorption in a high range of relative humidity as exhibited by a natural fiber. At the same time, it is especially advantageous that the polyamide of the invention exhibits only a slight moisture absorption in the lower range of relative humidity. This latter characteristic is quite important for rapid drying of textiles after they have been washed (drip-dry fabrics). In addition, the sensation of warmth in wearing clothing articles depends essentially upon and is proportional to the amount of difference between the moisture absorption at 65% rel. humidity and at 100% rel. humidity (see Melliand Textilberichte, vol. 44, 1963, p. 141).

Table 3 serves to illustrate these properties, wherein the moisture absorption of various fibers at 65% and 100% relative humidity are compared with each other.

TABLE 3.—MOISTURE ABSORPTION OF NATURAL AND SYNTHETIC FIBERS AT 65% and 100% REL. HUMIDITY

| Type of fiber | Moisture absorption in percent by wt. of fiber at relative humidities of— | | Difference in percentages of moisture absorption (100–65) |
|---|---|---|---|
| | 65% | 100% | |
| Wool | 13 | 32 | 19 |
| Raw cotton | 8.5 | 22.2 | 14 |
| Rayon | 9.5 | 32 | 22.5 |
| Polyamide A | 5.3 | 22.8 | 17.5 |
| Polyamide B | 3.9 | 8.4 | 4.5 |
| Polyamide C | 3.8 | 7.7 | 3.9 |
| Polyethyleneterephthalate | 2.9 | 7.4 | 4.5 |
| Polyacrylonitrile | 1.8 | 2.7 | 0.9 |

Polyamide A = polyamide with ether linkages prepared according to Example 9 below; Polyamide B = polycaprolactam, i.e. nylon 6; Polyamide C = polyhexamethyleneadipamide, i.e. nylon 66.

From Table 4, it will be apparent that the remaining textile properties of the fibers produced from a polyamide with ether linkages are not inferior to the corresponding properties of conventional commercial polyamide fibers. The fibers were spun from a mixed condensate or copolyamide of the AD-salt:AH-salt in a molar ratio of 1:1 and 1:2 corresponding to Example 9 below.

TABLE 4

| Textile data | Copolyamide 1:1 | | Copolyamide 1:2 | |
|---|---|---|---|---|
| | Dry | Wet | Dry | Wet |
| Titer in denier | 64 | | 63.4 | |
| Tensile strength, g. | 282 | 160 | 220.4 | 223.8 |
| Strength, g./denier | 4.4 | 2.5 | 3.75 | 38.2 |
| Elongation, percent | 41.1 | 51.8 | 31.5 | 36.3 |

The invention is further illustrated by means of the following examples.

EXAMPLE 1

Preparation of the pure initial materials

The preparation of the initial diaminoether reactant is shown by way of illustration for the ethylene-bis-(3-aminopropyl)ether, it being understood that the other diaminoethers should be prepared in the same manner and that hexamethylenediamine and its adipate are readily available in pure form.

(a) Ethylene-bis-(2-cyanoethyl)ether 450 grams of ethylene glycol were placed in a 2-liter, three-necked flask equipped with a cooler and mixer and mixed therein with 45 grams of an aqueous solution of 40% by weight KOH. While stirring and under a nitrogen atmosphere, 4.5 grams of pyrogallol were next dissolved therein and then 1000 cc. freshly distilled acrylonitrile were fed dropwise into the flask over a period of about 6 hours. At an internal temperature of the reaction mixture of 30° C. the reaction then lasts for an additional period of about 3 hours. After completion of the reaction, the mixture was neutralized with dilute hydrochloric acid and separated from a sedimentary residue. The reaction product was then treated with 600 cc. chloroform and washed all together three times with 375 ml. water. The separated solvent layer in this extraction was then dried over $CaCl_2$. After first expelling the chloroform, the desired product was distilled off at 140° C. under a vacuum, i.e. at 15 mm. Hg. The yield amounted to about 90% by weight of dinitrile. On account of the instability of the dinitrile, the distillation must take place rapidly (refractive index $\eta_D^{20}=1.4490$). The dinitrile is preferably stored under a nitrogen atmosphere.

(b) Ethylene-bis-(3-aminopropyl)ether 1000 grams of ethylene-bis-(2-cyanoethyl)ether, as obtained in the preceding paragraph, were mixed with 1200 cc. anhydrous tetrahydrofuran and hydrogenated in a 4.5-liter rotatable autoclave after addition of 50–100 grams of Raney cobalt as a catalyst and pressing in 500 cc. of liquid $NH_3$. The hydrogenation took place within about 6 hours at about 100° C. and 120 atm. hydrogen pressure. The reaction mixture was then decanted and filtered from the catalyst. The tetrahydrofuran was distilled off and recovered. The distillation of the ethylene-bis-(3-aminopropyl)ether took place over a column, withdrawing the product at 96° C. and 0.2 mm. Hg or at 145° C. and 14 mm. Hg. The yield of the desired ether was about 90%; refractive index $\eta_D^{20}=1.4634$. It was not possible to detect any 2-hydroxyethyl-3-aminopropyl-ether in a paper chromatographic test so that the content of this impurity was determined as being below 0.1 mol percent.

(c) Adipic acid salt of ethylene-bis-(3-aminopropyl)-ether, i.e. the AD-salt as defined herein 663.3 grams of adipic acid were suspended in 2000 cc. ethanol and added drop by drop with stirring into 800 grams of the pure ethylene-bis-(3-aminopropyl)ether as obtained from (b) above. A clear solution resulted from this admixture. After cooling, the salt had completely precipitated and was filtered off and washed with cold ethanol. Finally, the salt was once again recrystallized from ethanol and dried at 45 °C. in a vacuum drying chamber. The yield was 90% by weight of rod- or stick-shaped crystals with a melting point of 128.5° C. as determined optically according to Kofler.

The melting points of other adipic acid salts (AD-salts) of diaminoethers, which have been produced in the same manner as described above, are as follows:

|  | M.P.° C. |
|---|---|
| Bis-(3-aminopropyl)ether adipate | 136–137 |
| Propylene-bis-(3-aminopropyl)ether adipate | 130–131 |
| Butylene-bis-(3-aminopropyl)ether adipate | 130–133 |

The melting points will tend to vary with the amount of impurity contained therein, and while they serve as a partial check on the desired purity, it is helpful to also carry out spectrographic and/or chromatographic tests.

Comparative example.—Preparation of the initial diaminoether according to a more recent literature reference (Chemical Abstracts 1955, p. 4514h, vol. 49, I. N. Nazarov. G. A. Shvenkhgeimer and V. A. Rudenko).

1272 grams of acrylonitrile were added slowly over a period of 6 hours to a mixture of 744 grams ethylene glycol (12 mols) and 75 grams of a 40% aqueous KOH solution while stirring and cooling to maintain a temperature of 30° C. The mixture was then further stirred for another 4 hours at 30° C. The mixture was then permitted to stand over night and was then neutralized with HCl, filtered and distilled. There was obtained 1957 grams of product. 500 grams of this product was hydrogenated at 130 atm. hydrogen pressure in the presence of 50 grams Raney cobalt as catalyst and 1.2 liters of methanol which was saturated with ammonia gas. The fractional distillation of the hydrogenation product yielded the following:

| | Grams |
|---|---|
| First run, B.P.=60–86° C. at 0.2 mm. Hg | 7.0 |
| Main run, B.P.=86–93° C. at 0.2 mm. Hg | 406.5 |
| (1st) last run, B.P.=93–160° C. at 0.2 mm. Hg | 35.6 |
| (2nd) last run, B.P.=160° C. at 0.2 mm. Hg | 17.8 |
| Residue | 25.7 |

The 406.5 grams of the main run corresponded to a yield of 77.8% is one assumes that there is present only the pure ethylene-bis-(3-aminopropyl)ether. An analysis of this product, however, shows that it actually contains 38.8 mol percent of hydroxyaminoether.

EXAMPLE 2

Production of a polycondensate of bis-(3-aminopropyl)ether and adipic acid 100 grams of bis-(3-aminopropyl)ether adipate with a melting point of 136–137° C. were sealed into an evacuated bomb tube after first flushing the tube with nitrogen. The adipate was then precondensed for 3 hours in an agitated heating chamber at 210° C., cooled and dried at about 50° C. The solution viscosity amounted to $$\eta_{rel}=1.24$$

melting point=193–200° C.; molecular weight=3500.

50 grams of this low viscosity polymer or precondensate were melted in a flask for subsequent condensation at 220° C. and condensed with stirring under a nitrogen atmosphere at 0.3 mm. Hg up to a solution viscosity of 2.40 within a period of 3 hours. A colorless, hard polyamide was obtained with a melting point of 204–208° C. This polyamide was capable of being spun into filaments or rolled out into a foil. The swelling value, measured according to DIN-Specification 53814, amounted to 20%. The tensile strength of the filaments in the dry state amounted to 3.6 grams/denier.

EXAMPLE 3

Production of a polycondensate of ethylene-bis-(3-aminopropyl)ether adipate 3 kg. ethylene-bis-(3-aminopropyl)ether adipate with a melting point of 128.5° C. were introduced into a 10-liter autoclave with the addition of 0.576 g. boric acid (0.1 mol percent) without water. After flushing 3 times

11 with nitrogen and upon attaining an inner temperature of 180° C., the stirrer was switched on and the melt held at 180–200° C. for 2 hours. The entire precondensation took place under normal pressure while leading nitrogen over the melt. The water which was split off was withdrawn over a cooled condenser and collected in a receiver.

After the production of the precondensate in this manner, the autoclave was evacuated within one-half hour to 0.1 mm. Hg and the temperature increased to 220° C. for 3 hours with constant stirring. Thereafter, the polycondensate was pressed out or extruded under nitrogen pressure into water and drawn off as a clear, colorless noodle or strand. The solution viscosity of this final polycondensate amounted to $\eta_{rel}=3.11$; melting point=178–180° C.

EXAMPLE 4

Production of a polycondensate of propylene-bis-(3-aminopropyl)ether and adipic acid 38.00 grams of propylene-bis-(3-aminopropyl)ether were mixed with 29.20 grams of adipic acid and melted at 180° C. in a condensation flask under normal pressure. While stirring and up to the point at which water was completely split off, a reaction temperature was maintained at 180° C. After increasing the temperature of the melt to 200° C., the pressure was decreased to 0.15 mm. Hg and the melt condensed for 3 hours. The resulting polymer had a solution viscosity of $\eta_{rel}=2.28$ and a melting point=167–168° C.

EXAMPLE 5

Production of a polycondensate of the adipic acid salt of butylene-bis-(3-aminopropyl)ether 65 grams of the adipic acid salt of butylene-bis-(3-aminopropyl)ether were sealed into an evacuated bomb tube after flushing with nitrogen and precondensed for 3 hours at 170° C. in an agitated heater. The precondensate thus obtained (M.P.=160–162° C.) was particulated and dried in a vacuum at 50° C.

For further polycondensation, the dried precondensate was melted in a condensation flask under a nitrogen atmosphere and condensed over a period of 3 hours at 0.3 mm. Hg with stirring up to a solution viscosity of 2.10. A colorless polymer was obtained which had a melting point of 166° C. The molecular weight was about 16,000, and the swelling value about 30%.

EXAMPLE 6

Production of a mixed polycondensate of the adipic acid salt of bis-(3-aminopropyl)ether and the adipic acid salt of hexamethylenediamine, molar ratio of 1:1

27.8 grams of bis-(3-aminopropyl)ether adipate were mixed with 26.2 grams of the adipic acid salt of hexamethylenediamine (i.e. the AH-salt), and the mixture was melted under nitrogen and normal pressure at 220° C. Then, the reaction mixture was condensed while stirring for 2 hours. After increasing the melt temperature to 240° C., a vacuum was applied to reduce the pressure to 0.2 mm. Hg, and the condensation then carried to completion within another 2 hours. A polycondensate was obtained which melted at 223–225° C. and which had a melt viscosity of $\eta_{rel}=2.35$.

EXAMPLE 7

Production of a mixed polycondensate of the adipic acid salt of ethylene-bis-(3-aminopropyl)ether and the AH-salt, molar ratio 10:1

64.40 grams of ethylene-bis-(3-aminopropyl)ether adipate were mixed with 5.24 grams of the AH-salt, and the mixture was melted at 180° C. under normal pressure in a condensation flask with nitrogen rinsing. A reaction temperature of 180–200° C. was maintained while stirring up to the point where all water was split off. Then, after increasing the melt temperature to 220° C., it was placed

12 under a vacuum (0.2 mm. Hg) and further condensed for 3 hours. After cooling, there was obtained a hard, colorless condensate melting at 172–175° C. and having a solution viscosity of $\eta_{rel}=2.23$.

EXAMPLE 8

Production of a mixed polycondensate of the adipic acid salt of ethylene-bis-(3-aminopropyl)ether and the AH-salt, molar ratio 8:2

2492.9 grams of ethylene-bis-(3-aminopropyl)ether adipate were mixed with 507.1 grams of AH-salt and poured into a 10-liter autoclave. After flushing with nitrogen, this reaction mixture was heated for 2 hours at normal pressure under a weak stream of nitrogen. The stirrer for the autoclave was turned on after reaching the melt temperature of 180° C.

After termination of water cleavage or splitting off, a vacuum was applied to reduce the pressure to about 0.1 mm. Hg, and the melt was further condensed for 3 hours with stirring up to a final solution viscosity of $\eta_{rel}=2.05$. The melt temperature was increased in this vacuum stage to 220° C. The product was extruded into water. The resulting polycondensate had a solution viscosity sufficient to easily spin filaments or produce foils therefrom.

EXAMPLE 9

Production of a mixed polycondensate of the adipic acid salt of ethylene-bis-(3-aminopropyl)ether and the AH-salt, molar ratio 1:1

3 kg. of the AH-salt (1 mol) and 3.688 kg. of the adipic acid salt of ethylene-bis-(3-aminopropyl)ether (1 mol; M.P.=128.5° C.) were dissolved in 4.46 kg. of water. This 60% salt solution was poured into a 20-liter autoclave equipped with a stirrer while adding 0.707 gram of boric acid (0.1 mol percent with reference to the ether adipate). Then, precondensation was carried out for 3 hours at 210° C. and under about 10 atm. pressure with stirring. Within 1 hour and 30 minutes, the pressure was then reduced to normal pressure and the temperature immediately increased to 240° C. The reaction mixture was further stirred at this temperature for another one and one-half hour, whereupon the stirrer was turned off and nitrogen was directed through the melt for another one-half hour. The polycondensate was next extruded through a slotted nozzle and drawn off in the form of a band. The air dried product was then cut into small particles and dried. The cuttings were clear and colorless. The yield amounted to 5.4 kg.=86% of the theoretical yield. The solution viscosity $\eta_{rel}=2.47$; melting point=205–212° C.; molecular weight=20,000; density=1.14 (at 20° C.).

EXAMPLE 10

Production of a mixed polycondensate of the adipic acid salt of ethylene-bis-(3-aminopropyl)ether (i.e. the AD-salt) molar ratio 1:4.

3.25 kg. of the AH-salt (4 mols) and 1 kg. of the AD-salt having the formula

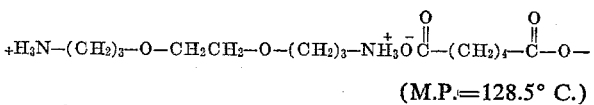

(M.P.=128.5° C.)

were introduced into a 10-liter autoclave together with the addition of 0.096 gram of boric acid as a catalyst. After flushing the autoclave three times with nitrogen, the contents were heated up to a melt temperature of 220° C. at which point a stirrer in the autoclave was turned on and the melt then maintained at 220–240° C. for two hours. The entire precondensation took place at normal pressure while conducting nitrogen through the vessel over the melt. The split-off water was withdrawn over a condenser and collected in a receiver.

After producing the precondensate in this manner, the autoclave was evacuated within 30 minutes to a pressure of 0.1 mm. Hg and the temperature increased to 280° C. with continuous stirring at this temperature for another 3 hours. The polycondensate was thereafter extruded into water as a clear and colorless noodle. The solution viscosity of this final polycondensate product was $\eta_{rel}=2.78$, and its melting point was 236–240° C.

EXAMPLE 11

Production of mixed polycondensates of the adipic acid salt of ethylene-bis-(3-aminopropyl)ether as the AD-salt and the adipic acid salt of hexamethylenediamine as the AH-salt in various molar ratios of 9:1 to 1:9.

A series of preparations were made using the AD-salt and the AH-salt in various ratios, the procedure for the production of the precondensate and the final condensate being the same as that used in Example 7 for molar ratios of AD-salt:AH-salt of 9:1 to 7:3 and the same as that used in Examples 9 or 10 for the remaining molar ratios of 6:4 to 1:9. The following Tables 5 and 6 provide a summary of the reaction conditions and the results:

TABLE 5

| Molar Ratio AD-salt:AH-salt | Precondensation | | Final Condensation | |
|---|---|---|---|---|
| | Reaction temp., ° C. | Melting point, ° C. | Reaction temp., ° C. | Melting point, ° C. |
| 9:1 | 180 | 143–149 | 223 | 171–175 |
| 8:2 | 180 | 149–154 | 223 | 164–166 |
| 7:3 | 180 | 166–172 | 240–242 | 177–183 |
| 6:4 | 180 | 170–180 | 240–243 | 196–199 |
| 5:5 | 185 | 203–206 | 240 | 205–212 |
| 4:6 | 190 | 208–214 | 240–243 | 214–218 |
| 3:7 | 190 | 215–218 | 240–243 | 227–232 |
| 2:8 | 220 | 222–226 | 281 | 236–240 |
| 1:9 | 220 | 234–239 | 281 | 238–243 |

TABLE 6

| Molar ratio D-Salt:AH-salt | Precondensate | | Final condensate | |
|---|---|---|---|---|
| | Sol'n viscosity $\eta_{rel}$ | Molecular weight | Sol'n viscosity $\eta_{rel}$ | Molecular weight |
| 9:1 | 1.16 | 2,000 | 2.17 | 17,500 |
| 8:2 | 1.14 | 2,000 | 2.01 | 14,000 |
| 7:3 | 1.14 | 2,000 | 2.30 | 19,500 |
| 6:4 | 1.14 | 2,000 | 2.38 | 20,000 |
| 5:5 | 1.16 | 2,000 | 2.08 | 19,500 |
| 4:6 | 1.15 | 2,000 | 2.64 | 20,500 |
| 3:7 | 1.15 | 2,000 | 3.00 | 30,000 |
| 2:8 | 1.25 | 3,000 | 2.78 | 23,000 |
| 1:9 | 1.25 | 3,000 | 2.64 | 30,000 |

The molecular weight was determined by terminal carboxylic groups.

EXAMPLE 12

Production of a mixed polycondensate of the adipic acid salt of butylene - bis - (3 - aminopropyl)ether and the AH-salt, molar ratio 5:1

70.00 grams of the pure diaminoether adipic acid salt were mixed with 10.48 grams of the AH-salt and melted under normal pressure and nitrogen rinsing at 180° C. At this temperature, precondensation took place while stirring for a period of 2 hours, thereafter, the reaction vessel was evacuated down to 0.2 mm. Hg and the condensation continued at 180° C. for 3 hours to its completion. The solution viscosity of the polycondensate amounted to $\eta_{rel}=2.47$; the melting point was 154–156° C.

EXAMPLE 13

Moisture absorption of polycondensate scrapings produced from pure ethylene-bis-3 - aminopropyl)ether adipate in admixture with the adipic acid salt of hexamethylenediamine in the rolar ratio of 1:9 to 9:1

The polycondensates produced according to Examples 3 and 11 were scraped to form small granules or particles and sifted through a screen (20 M/cm.²). In order to determine the moisture absorption, the dry scrapings were placed in a climate-controlled chamber at 20° C. (±1° C.) at relative humidities of 65% and 100%, respectively. The moisture absorption of these polycondensates as mentioned above are plotted in comparison with nylon 66 (polyhexamethylenediamine adipamide) on the graphs of FIGS. 2 and 3.

EXAMPLE 14

Comparative example as opposed to Example 3

In order to provide an experimental picture concerning the actual extent of the disturbing effect which can be expected from a content of the hydroxyaminoether compound (VI) in the polycondensation of polyamides with ether linkages, a condensate was produced while intentionally adding the impurity (VI). The mixtures in the following description correspond approximately to those compositions which would be obtained if the diaminoether (III) contaminated with compound (VI) were erroneously assumed to be a pure substance. The influence on the properties of the polycondensate by the presence of (VI) is so obvious that mixed polycondensates with only up to 10% of (VI) were tested.

The salts used in the tests had the following composition in terms of molar proportions of the individual components:

$(1-x)$ mols of the diaminoether (III)
$x$ mols of the hydroxyaminoether (VI)
1 mol of adipic acid.

(molecular weights: (III)=176.26; (VI)=119.16; adipic acid=146.14).

The molar fraction of the "impurity" was varied from 0.005 to 0.10. The same results are achieved in the polycondensation regardless of whether the individually produced neutral salts are mixed or whether a suspension of adipic acid in ethanol is neutralized with the amine mixture in proportions calculated according to the above described composition. The condensate was produced in the same manner as in Example 3. The solution viscosity and melting points are summarized in Table 7.

TABLE 7

[Polycondensate of (1-$x$) mols of the diamonoether-adipate and $x$ mols of the hydroxyaminoether-adipate.]

| $x$ | Solution viscosity | M.P., ° C. |
|---|---|---|
| 0.005 | 2.17 | 178–182 |
| 0.01 | 1.92 | 177–182 |
| 0.03 | 1.56 | 179–180 |
| 0.05 | 1.39 | 178–180 |
| 0.10 | 1.23 | 174–177 |

It is thus shown that the attainable values of viscosity are critically limited by the content of the hydroxyaminoether. With as much as 10 mol percent of the impurity, which can be easily contained in the diaminoether (III) where one has not employed a special purification method, polycondensates with a viscosity value of less than 1.3 are obtained. Such polyamides are not at all suitable for spinning filaments. Thus, the difficulties in prior attempts to produce polycondensates is fully explained by the presence of the hydroxyaminoether impurity which must be removed below a critical value of about 1 mol percent and preferably below 0.5 mol percent with reference to the total number of mols of the adipate salt, if one is to achieve commercially useful polyamides with ether linkages.

In all of the foregoing examples of preparing the polycondensate, except comparative Example 14, the diaminoether component was first carefully purified in the manner described in Example 1(a) and 1(b). Although this preparation of the initial ether reactant is not specifically claimed herein, it will be recognized that such steps provide a previously untaught means of achieving diaminoethers which are substantially free of the hydroxyaminoether impurity. More importantly by failing to recognize the damaging effect of this impurity on the desired polyamides with ether linkages, it was not previously possible to achieve a satisfactory polycondensation or useful polyamide products for the textile industry.

The process of the invention and the highly useful polyamides obtained thereby may be modified in the same manner as conventional nylons provided that the particular conditions of this invention are carefully observed. For example, part or even all of the adipic acid can be replaced by other saturated dicarboxylic acids, although it is preferable to use adipic acid with not more than 5% by weight of any such modifying acids. Likewise, side chains can be introduced into the molecule or the polymers can be aftertreated to achieve special effects.

Finally, it is quite permissible to admix with the polycondensate various known dyes, pigments, delustering agents, stabilizers against heat and/or light, fillers and the like. All such minor variations are intended to fall within the scope of the invention as claimed hereafter.

The invention is hereby claimed as follows:

1. In a process for the production of a polyamide having ether linkages from the adipic acid salt of one or more aliphatic diamines including at least one diaminoether of the formula $$H_2N-(CH_2)_3-R-(CH_2)_3-NH_2$$

wherein R represents a divalent radical selected from the group consisting of —O— and —O—$(CH_2)_n$—O— in which $n$ is an integer of 2 to 4, inclusive, by heating said adipic acid salt at an elevated temperature sufficient to form a high molecular weight polyamide, the improvement which comprises:

polycondensing a diaminoether-adipic acid salt as defined above and having a hydroxyaminoether content of less than 1 mol percent, with reference to the total mols of the ether components, in a first stage at an initial polycondensation temperature just sufficient to maintain the condensation reaction mixture in the molten state but not higher than 250° C. until a precondensate is formed with a solution viscosity of about 1.10 to 1.30, and then further polycondensing the reaction mixture in a second stage up to a final polycondensation temperature of about 10–60° C. higher than said initial temperature and for a period of time sufficient to obtain a linear fiber-forming polyamide having a solution viscosity of about 2.0 to 3.5, the solution viscosity in each instance being determined as a 1% by weight solution of the polycondensate in 90% aqueous formic acid at 25° C.

2. A process as claimed in claim 1 wherein the hydroxyaminoether content is less than about 0.5 mol percent.

3. A process as claimed in claim 2 wherein the diaminoether is the compound of the formula $$H_2N-(CH_2)_3-O-CH_2CH_2-O-(CH_2)_3-NH_2$$

and the hydroxyaminoether as an impurity consists essentially of the compound of the formula $$HO-CH_2CH_2-O-(CH_2)_3-NH_2$$

4. A process as claimed in claim 1 wherein the initial polycondensation is carried out at a pressure of 1–10 atmospheres, the final polycondensation is carried out under a vacuum, and both stages of the polycondensation are maintained under an inert atmosphere.

5. A process as claimed in claim 1 wherein the polyamide-forming reactants consist essentially of said diaminoether and said adipic acid.

6. A process as claimed in claim 1 wherein there are copolycondensed (A) the adipic acid salt of said diaminoether and (B) the adipic acid salt of hexamethylenediamine in a molar ratio of (A):(B) of at least 1:9 up to about 9:1.

7. A process as claimed in claim 6 wherein the molar ratio of (A):(B) is about 1:1 to 4:1.

8. A process as claimed in claim 7 wherein said diaminoether is the compound of the formula $$H_2N-(CH_2)_3-O-CH_2CH_2-O-(CH_2)_3-NH_2$$

References Cited
UNITED STATES PATENTS

| | | | |
|---|---|---|---|
| 2,163,636 | 6/1939 | Spanagel | 260—78 |
| 2,172,374 | 9/1939 | Flory | 260—78 |
| 2,359,867 | 10/1944 | Martin | 260—78 |
| 2,625,536 | 1/1953 | Kirby | 260—78 |
| 2,831,834 | 4/1958 | Magat | 260—78 |

H. D. ANDERSON, Primary Examiner

U.S. Cl. X.R.

260—31.2, 95